(12) United States Patent
Bonazzoli et al.

(10) Patent No.: US 10,574,612 B2
(45) Date of Patent: Feb. 25, 2020

(54) CLEANING CHAT HISTORY BASED ON RELEVANCY

(71) Applicant: INTERNATIONAL BUSINESS MACHINES CORPORATION, Armonk, NY (US)

(72) Inventors: Simone Bonazzoli, Rome (IT); Marco Borgianni, Rome (IT); Claudio Falcone, Rome (IT); Alessio Fioravanti, Rome (IT); Giuseppe Longobardi, Naples (IT); Silvano Lutri, Rome (IT); Luigi Presti, L'Aquila (IT); Paolo Salerno, Rome (IT); Alessandro Tomasi, Aprillia (IT); Francesca Ziantoni, Rome (IT)

(73) Assignee: INTERNATIONAL BUSINESS MACHINES CORPORATION, Armonk, NY (US)

(\*) Notice: Subject to any disclaimer, the term of this patent is extended or adjusted under 35 U.S.C. 154(b) by 125 days.

(21) Appl. No.: 15/461,674

(22) Filed: Mar. 17, 2017

(65) Prior Publication Data
US 2018/0270325 A1 Sep. 20, 2018

(51) Int. Cl.
*H04L 12/58* (2006.01)
*H04L 29/08* (2006.01)

(52) U.S. Cl.
CPC .............. *H04L 51/16* (2013.01); *H04L 51/12* (2013.01); *H04L 51/32* (2013.01); *H04L 67/22* (2013.01); *H04L 67/30* (2013.01)

(58) Field of Classification Search
CPC ......... H04L 41/00; H04L 41/06; H04L 43/00; H04L 43/08; H04L 51/00; H04L 51/02; H04L 51/04–046; H04L 51/10; H04L 51/12; H04L 51/16; H04L 51/32; H04L 51/34; H04L 67/00; H04L 67/22; H04L 67/30; H04L 67/306
See application file for complete search history.

(56) References Cited

U.S. PATENT DOCUMENTS

| | | | |
|---|---|---|---|
| 9,047,283 | B1 | 6/2015 | Zhang et al. |
| 9,306,893 | B2 | 4/2016 | Sharp et al. |
| 9,729,392 | B2 | 8/2017 | Balasaygun |
| 2013/0218877 | A1 | 8/2013 | Satyanarayanan |
| 2014/0195562 | A1 | 7/2014 | Hardeniya et al. |
| 2015/0012846 | A1 | 1/2015 | Xie |

*Primary Examiner* — Tauqir Hussain
*Assistant Examiner* — Boris D Grijalva Lobos
(74) *Attorney, Agent, or Firm* — Michael A. Petrocelli, Esq.; Kevin P. Radigan, Esq.; Heslin Rothenberg Farley & Mesiti P.C.

(57) ABSTRACT

A method is provided for deleting a content element of a chat history lacking long-term relevance. The method includes receiving a content element, conditionally assigning the content element to the topic, determining a relationship index value for the content element to the topic using a validity value, which is a function of an access rate and a credibility index value. The method may also include comparing the relationship index threshold value for the topic of a first chat user, where the content element has been generated by a second chat user. The method also includes linking the content element of the second chat user to the topic in the chat history of the first user, and deleting the content element if it is not linked to any other chat history of another chat user of the plurality of chat users.

20 Claims, 4 Drawing Sheets

CLEANING CHAT HISTORY BASED ON RELEVANCY

BACKGROUND

The invention relates generally to a method, system and computer program product for deleting a content element of a chat history, and more specifically, to keeping the content element or deleting the element based on its relevancy.

The increasing need to receive information quickly and easily has contributed to an increasing use of chat systems during the work day. Today, chats are a common way to communicate with colleagues, either to get information an employee requires to perform a certain task, or—on the other side—to break up the monotony of the day with short jokes or topics relating to everyday life. In some work environments, chats have not only enhanced communication by email but in many cases replaced part of the email traffic. Additionally, the chat communication channel is an additional "back channel" in case of telephone conferences.

Typically, chat message exchanges are meant for the actual moment of a chat message. However, often, there is a need to go back and search the history of a chat for certain information exchanged at an earlier time. Typically, such information is buried under longer chat message exchanges, which may include also off-topic messages or messages overlapping with other message topics. There are cases in which the chat history may be saved for a period of time, after which the chat contributions are lost if a user has not saved content in another file for longer term storage.

Storing chat contributions over an unlimited or undefined time may require too much storage space at the chat system server and/or a local device. Also, because of the irrelevant private, everyday life chat contributions, a lot of storage space may be consumed to only save some longer term relevant information which may have a longer term business value for one or more users.

SUMMARY

In one or more aspects, a computer-implemented method is provided for deleting a content element of a chat history of a chat user of a plurality of chat users where the content element lacks a long-term relevance. The computer-implemented method includes receiving a topic and a user-specified tag relating to the topic, receiving a content element of the chat user and storing the content element in a common chat history repository, and assigning, by a semantic engine, the content element to the topic based on the tag being found in the content element. In addition, the computer-implemented includes determining a relationship index value for the content element to the topic using a validity value for the content element. The validity value is a function of an access rate to the topic and a credibility index value of an author of the content element. The method also includes comparing the determined relationship index value of the content element to a relationship index threshold value for the topic of a first chat user of the plurality of chat users, where the content element has been generated by a second chat user of the plurality of chat users. Further, the method includes linking the content element of the second chat user to the topic in the chat history of the first chat user, and deleting the content element where it is not linked to any other chat history of another chat user of the plurality of chat users.

Systems and computer program products relating to one or more aspects disclosed herein may also be described and claimed herein.

Additional features and advantages may be realized through the techniques described herein. Other embodiments and aspects are described in detail herein, and are considered a part of the claimed aspects.

BRIEF DESCRIPTION OF THE DRAWINGS

It should be noted that embodiments of the invention are described herein with reference to different subject-matters. In particular, some embodiments are described with reference to method type claims, whereas other embodiments are described with reference to apparatus type claims. However, a person skilled in the art will gather from description provided that, unless otherwise notified, in addition to any combination of features belonging to one type of subject-matter, also any combination between features relating to different subject-matters, in particular, between features of the method type claims, and features of the system type claims, is considered as to be disclosed within this document.

The aspects defined above and further aspects of the present invention are apparent from the examples of embodiments described herein, and explained with reference to the examples of embodiments, but to which the invention is not limited. Embodiments of the invention are described, by way of example only, with reference to the drawings, in which.

DETAILED DESCRIPTION

Figure 1:
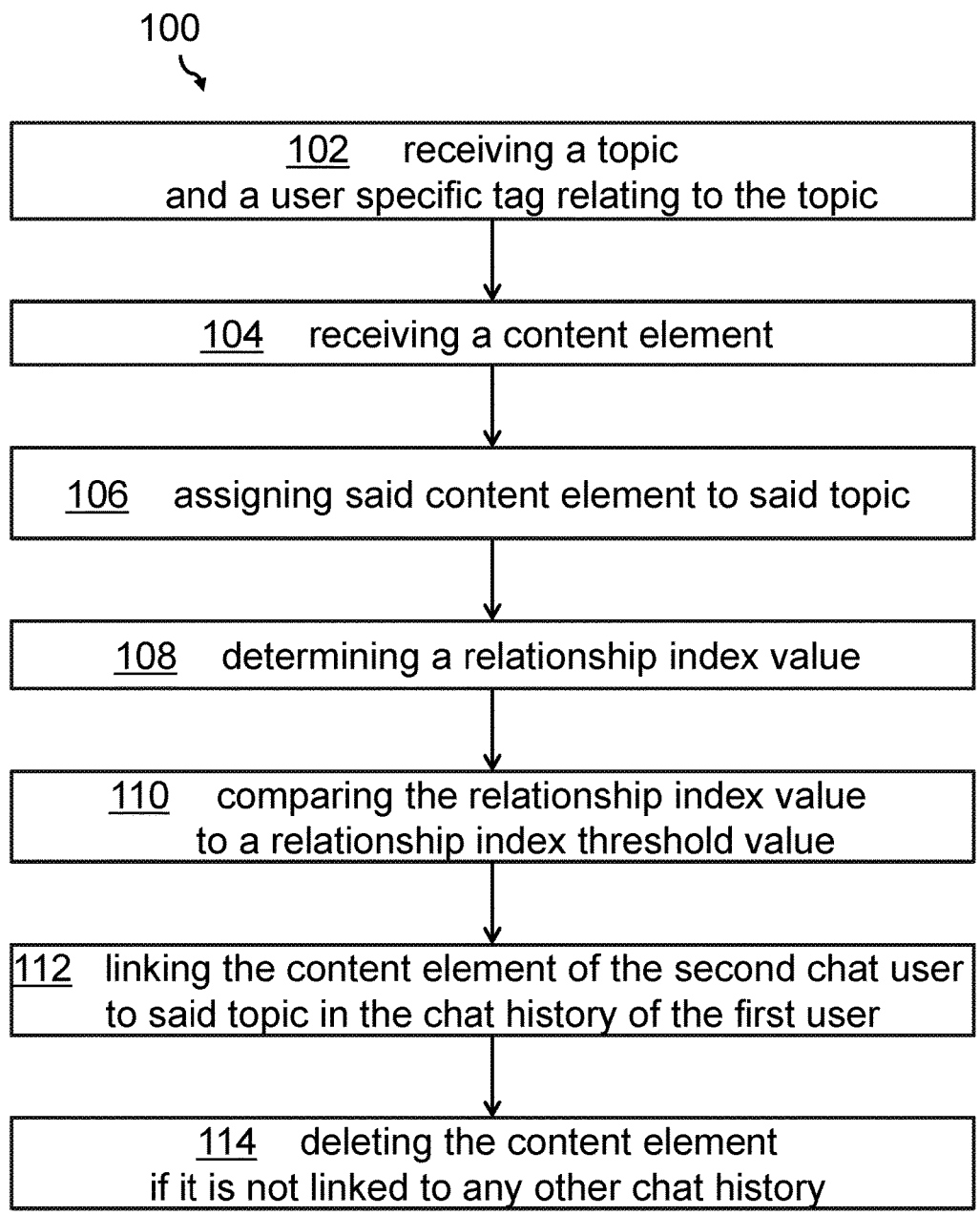
FIG. 1 shows a block diagram of one embodiment of a process for deleting a content element of a chat history, in accordance with one or more aspects of the present invention.

In the context of this description, the following conventions, terms and/or expressions may be used.

The term 'chat system' or chat message communication system may denote a system for enabling an online chat, and may thus refer to any kind of communication over the Internet that offers a real-time transmission of text messages from a sending user system to a receiving user system. Chat messages may generally be short in order to enable other participants to grasp the content and respond quickly. Thereby a feeling, similar to a spoken conversation, is created which distinguishes chatting from other text-based online communication forms such as Internet forums and email. Online chats may address point-to-point communications as well as multicast communications from one sender to many receivers.

Online chat, in a less stringent definition, may here primarily be any direct text-based, one-on-one chat or one-to-many group chat (formally also known as synchronous conferencing), using tools such as instant messengers, Internet Relay Chat (IRC) and talkers. The expression 'online chat' comes from the word chat which means "informal conversation". Online chat includes web-based applications that allow communication—often directly addressed, but anonymous between users in a multi-user environment.

The chat systems discussed in the context of this document may mainly be related to one organization, i.e., one enterprise, or in an enterprise together with suppliers and customers, i.e., an ecosystem of an enterprise. Generally speaking, the chat users of the chat system in question may have some sort of common interest or organization boundaries, i.e., a preselected group of chat users. Typically, this is not the case for public chat systems which may not have any boundaries in terms of participants, i.e., chat users.

The term 'a content element' may denote a message or chat contribution in a chat system context. The content element includes typically a couple of words (could be only one word) up to several complete or incomplete sentences. Any text is possible, including program code segments and/or Internet links and and/or acronyms and/or a sentence fragment and the like.

The term 'long-term relevance' may denote an importance of a content element to the chat community. The relevance may reflect an organizational, content or business value for a specific group of chat users. The relevance may be determined based on rules, policies and/or dedicated logical and/or mathematically definable dependencies. The following example may illustrate this: a discussion about the actual weather may be completely irrelevant for a semiconductor manufacturer; on the other hand, such a weather discussion may be of importance for a beverage company if it is to be decided how many beverage containers should be ordered before the next weekend because it is of critical importance to order and/or deliver enough beverage containers and be able to fulfill the upcoming demand in the light of long, sunny hours on the weekend.

The term 'topic' may denote an expression—i.e., one or a few words—describing themes relevant for the related chat user group. The topic may further be described in detail by one or a set of tags related to the topic. In the context of this document, the tag or the tags may be user specific. Thus, a specific topic may be relevant for a chat user for different reasons, under different aspects and thus, being described with individual tags.

The term 'common chat history repository' may denote a storage accessible by the chat system for storing chat system relevant data like content elements of chat threads, administrative data, user specific data—i.e., profiles, access information, etc.—as well as topics and tags, as defined above. All user specific data may be summarized in a chat user profile. All non-chat-user specific data may be stored as administrative data of the chat system. The common chat history repository may have the form of a database or content management system. In specific embodiments, the common chat history repository may be organized in a wiki structure or a BLOG structure. A skilled person may understand a BLOG (a truncation of the expression 'weblog') as a discussion or informational website published on the World Wide Web—here better an Intranet or a closed user group in an Internet chat system—consisting of discrete, often informal diary-style text entries (known as "posts").

The term 'semantic engine' may denote a technology for text processing for analyzing a text or text segments, like content elements of chat contributions. The semantic engine may relate a content element to a topic using the topic-related tags as well as its semantic meaning. A very simple approach may be just to search for one or more of the definable tags per topic in the chat system in the content element. A more sophisticated approach would also include synonyms or synonym phrases having the same or semantically similar meaning for such an analysis. Basically, the semantic engine may tokenize the incoming content elements in order to relate them to the available topics. It may also be noted that a threshold value may be set for the semantic engine on order to define the similarity of expressions.

The term 'relationship index value' may denote a numerical value for relationship of a content element from a chat user to a topic and at the same time any user of the chat system.

The term 'access rate to the topic' may denote the number of accesses, requests or retrievals to a content item relating to a specific topic. The number may, e.g., be increased each time, a chat user accesses a (historic) content element relating to the topic or if a query regarding a specific topic may be received by the chat system.

The term 'credibility index value' may denote an expression of trust regarding a specific chat user, i.e., the credibility of the user. This may be measured in 'likes' a user may receive for past chat contributions, i.e., historic content elements of the user, to a topic. Thus, the credibility index of a user may be topic dependent.

It may also be noted that, for comprehensibility reasons, terms typically relating to a coefficient having a value may be expressed by the coefficient directly. E.g., the terms 'tag' and 'tag value' or 'topic' and 'topic value' may be understood as equivalent. In a more mathematical oriented understanding the term topic may relate to the variable named "topic" which may have a specific value like "October", "street", "semiconductor", "gardening", "rocket", "robot" or "IBM", just to name a couple of examples.

The proposed method for deleting a content element of a chat history may offer multiple advantages and technical effects:

For instance, significant of long-term chat storage space may be saved by not storing chat contributions which may have no long-term relevancy. Examples may be private chat contributions relating to the actual weather or cinema program if that is not part of the business environment for the users exchanging chat messages.

The users—i.e., the employees of an enterprise or another close user group—may define the topics that are relevant for a specific business environment. Tags may be used by the users—or machine-supported—to define meaning of a topic. Thus, topics get a certain fingerprint based on a unique combination of tags assigned to them. The meaning of a topic may develop over time if the number of tags per topic grows over time. This way, sub-topics of a main topic may be definable. Additionally, the meaning of a topic may also be user-specific because each chat user may define his own tag cloud around a system-wide topic.

Categorizing chat contributions, i.e., content elements—automatically by analyzing those using the known tags, may allow relating of certain chat contributions to predefined topics. In case a topic is not clearly identifiable, a user may be asked to categorize the content element to one of the available topics in the system or define a new one. That way, a process as disclosed herein, and related system, may auto-learn new content and determination criteria in order to categorize chat contributions. This may, e.g., be achieved by defining new tags for topics and thus fine-tune meanings of a topic. Additionally, a semantic engine may also analyze the environment of a certain chat contribution—i.e., the chat contributions/content elements before and after the chat contribution in question in order to find a correct fit of a content element to a topic.

Using a relevancy factor, a relationship index and a reliability value of a content element based on a series of different influential factors, the method may determine which content elements may be stored for a longer time—which may be definable—or to delete the chat contribution in question right away or after a predefined period of time. That way, only those chat contributions may be stored longer term that have a certain business relevance for an enterprise or for a certain user community. Clearly, the proposed concept may not only work inside an enterprise—i.e., company internal chat systems—but also those communities being stabled for a certain more or less precisely defined context (e.g., fisher's chat, motor-cycling chat, dancing chat, football chat, etc.). Thus, chat contributions may be deleted which may be off-topic for a certain context.

In summary, a collective memory based on chat contributions may be generated over time. The self-learning capabilities—by means of adding relevant topics and managing the topic portfolio, by means of adaptively expanding tag clouds around topics and by automatically adjusting relevancy values, validity values, relationship values and related threshold values—contribute to a knowledge-base of an enterprise or community that adapts itself over time with changing priorities and focus areas. The so developing knowledge basis may also be seen as digital experience or digital memory of an enterprise and may help new members of the enterprise and/or community to identify views, evaluations and evolutions of earlier discussed topics.

Furthermore, by means of limiting the amount of chat contribution—i.e., chat elements—it becomes easier for a user to search the history for a specific information. He may simply find the content it is looking for faster.

In the following discussion, additional embodiments of the method and the related system will be described.

The initially noted needs may be addressed by a method for deleting a content element of a chat history, a system for deleting a content element of a chat history, a computing system, and a computer program product, according to the claims presented.

According to one aspect of the present invention, a method for deleting a content element of a chat history may be provided. The chat history may be related to a chat user of a plurality of chat users and the content item may be deleted if it does not have a long-term relevance. The method may include receiving a topic and a user specific tag relating to the topic, receiving a content element—i.e., a chat contribution—of the chat user and store it in a common chat history repository of, e.g., a chat system server.

The method may further include assigning, by a semantic engine, the content element to the topic if the tag is found in the content element, determining a relationship index value for the content element to the topic using a validity value for the content element. The validity value may be a function of an access rate to the topic and a credibility index value of the chat user author of the content element.

Furthermore, the method includes comparing the determined relationship index value of the content element to a relationship index threshold value for the topic of a first chat user of the plurality of chat users, wherein the content element has been generated by a second chat user of the plurality of chat users, linking the content element of the second chat user to the topic in the chat history of the first user, and deleting the content element if it is not linked to any other chat history of another chat user of the plurality of chat users.

According to another aspect of the present invention, a system for deleting a content element of a chat history may be provided. The system may have specific modules and units adapted to performing the method for deleting a content element of a chat history.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

One embodiment of the method may also include using the topic as sorting criterion in the common chat history repository, and publishing the content elements sorted by the topic. Hence, this process may be instrumental in developing, maintaining and making accessible a collective digital memory of a group or company, i.e., of all those using the chat system.

According to an advantageous embodiment of the method, the assigning, the determining, the comparing, the linking and the deleting may each be performed periodically or at a predefined point in time. There may be a series of predefined times defined and potentially adapted a plurality of points in time. Thus, a consolidation of the common chat history repository may be performed regularly. This may also enable to reflect chat elements with a later time stamp than that of a chat element under the same thread analysis before a deletion.

According to one embodiment of the method, the validity index may be defined as:

$$\text{validity index} = \text{access rate to the topic} * \text{credibility index value},$$

wherein the credibility index value of a chat user is defined as a number of positive feedback tags—e.g., 'likes', 'thumb up messages' or similar—related to content elements of the chat user for a specific topic, i.e., theme. Thus, not every content element will be archived for the future but only those content elements have a chance to be stored longer term having at least a certain level of validity. The access rate to the topic may be understood as the access rate by all potential users, and not limited to a specific chat user. The access rate to the topic may—in general—reflect the interest of the chat community to the topic.

According to a further embodiment of the method, the relationship index may be defined by:

$$\max[(\#\text{tag\_user-i}/\#\text{tag\_current})/\text{validity index}], \text{ for all } i \text{ users subscribed to a specific topic;}$$

wherein tag_user-i is a number of tags defined for a topic by user-i; and tag_current is a number of tags present in the content element.

Here, the expression 'present' may also include synonyms and/or semantically equal and or similar expressions. The validity index of content element has already been defined in the paragraph above.

Hence, the relationship index may determine to which topic a content element may be related to the most. This value may be checked user dependent because each chat user may (a) define his own tags for a topic, and (b) has its own number of tags for the topic. A simple example may illustrate the relationship: a content element includes tag1, tag2, tag5 and tag6; and the user-1 has defined one of the topics using his tags tag1, tag3 tag6. Thus, in this example, #tag_user-1=4 because chat user-1 has defined four tags for his understanding of the relevant topic. In the same example, the #tag_current is a number of tags present in the content element; thus, #tag_current=2, because tag1 and tag6 are included in the content element.

According to an optional embodiment of the method, a user specific weight value may be assigned to the user specific tag of a topic. More particularly, some tags may be more important than others, according to the user, so their presence in a content element may have a higher weight, so #tag_current(i) is not simply the "counter" of the matching tags, but the weighted matching tags, i.e., multiplied, with an importance coefficient which may be a decimal number between from 0—meaning not relevant—to 1—having importance. In a further optional embodiment defining a topic may be restricted to a subset of all chat users—e.g., "key users" or administrators—considered as reference champions.

According to one embodiment, the method may also include receiving an input value—in particular from a chat user—for determining to which topic a newly received content element is to be assigned if a determined number of tags—potentially combined with weighing factors—in the content element does not indicate a unique relationship to exactly one topic. This may give the chat user influence on the functionality of the discussed chat system. The chat user may be the final decision maker. In case of uncertainty, the user may also decide to relate the newly received—or better newly created—content element to the related two topics.

According to a further embodiment of the method, the assigning, by the semantic engine, the content element to the topic may also take into account earlier and/or later content elements in a same chat thread. Hence, a content element to be analyzed and potentially be marked as having a longer-term relevance may be accessed in a near-term contextual environment of the content element, i.e., content elements before and after the actual content elements from the chat user or those chat user(s) having responded to the content element by another content element. Thus, this may make the complete method and system more context-sensitive and accurate.

A detailed description of the figures is provided below. All instructions in the figures are schematic. Firstly, a block diagram of an embodiment of the inventive method for deleting a content element of a chat history is given. Afterwards, further embodiments, as well as embodiments of the system for deleting a content element of a chat history, are described.

FIG. 1 shows a block diagram of one embodiment of a method 100 for deleting a content element of a chat history of a chat user of a plurality of chat users if the content element does not have a long-term relevance, in accordance with one or more aspects of the present invention. The relevance may express an intrinsic interest of the user community of the chat system to maintain a content element for a longer period of time than those content elements not being of general interest. The method 100 includes receiving, 102, a topic. The topic may be a term being available globally within the chat system. Thus, every chat user may see it. On the other side, there may be at least one user specific tag relating to the topic. Hence, every user may define a topic according to the user's own experience background, and with the user's own words, e.g., his own tags.

The method includes receiving, 104, a content element of a chat user. Such a content element may be used synonymously for a chat contribution or simply a chat post within the chat system. Typically, a content element or chat contribution is directed to a conversation partner in a chat thread. The content element may be stored in a common chat history repository, e.g., of the chat system server.

Furthermore, the method includes assigning, 106, the content element to the topic if the tag is found in the content element. This is done by a semantic engine. In this sense, the expression "if the tech is found" is to be interpreted as "semantically found". This process may also be characterized as tokenizing the content element and try to find related expressions—in the easiest case equal expressions—in the word clouds built by the tags around the topics by the chat users. If a tag match exists between a newly received content element and more than one topic, the chat user having created the context element may be given the choice to decide to which topic the content element should be related. In one embodiment, the tag in question may be related to more than one topic if a straightforward determination of a specific topic is not possible.

As a further step, the method includes determining, 108, a relationship index value for the content element to the topic, i.e., it may be decided how close the content element is semantically linked to the topic. For this, a validity value for the content element is used.

The validity value is a function—in particular a mathematical product—of an access rate to the topic—and/or related content elements—and a credibility index value of the chat user—i.e., the author—of the content element.

Additionally, the method includes comparing, 110, the determined relationship index value of the content element to a relationship index threshold value for the topic of a first chat user of the plurality of chat users, wherein the content element has been generated by a second chat user of the plurality of chat users, linking, 112, the content element of the second chat user to the topic in the chat history of the first user, and deleting, 114, the content element if it is not linked to any other chat history of another chat user of the plurality of chat users.

As a result, a consolidated chat history remains in a common chat repository representing a community knowledge of the chat users and preserve it for future access by any chat user of the community, even if the chat user may not have been part of the original discussion.

Figure 2:
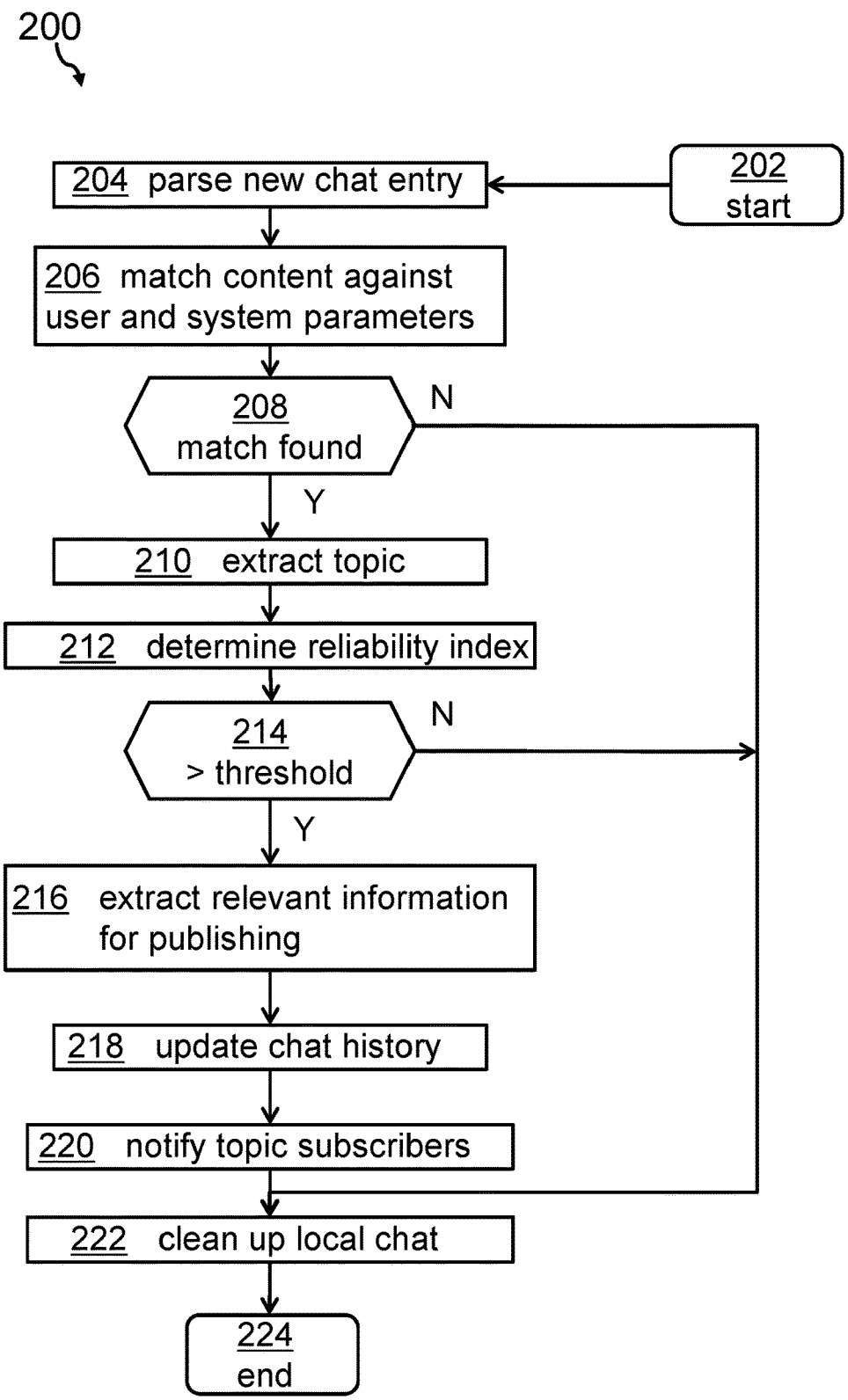
FIG. 2 shows a block diagram of a more detailed process embodiment, in accordance with one or more aspects of the present invention.

FIG. 2 shows a block diagram of one embodiment of a more detailed flow chart 200, in accordance with one or more aspects of the present invention. After the start 202 of the procedure, a new chat entry may be parsed, 204. It may be understood that the procedure repeats itself until all untreated—non-parsed chat entries—may have been parsed, and a decision about a deletion may have been made. Next, the new chat entry may be matched, 206, against user and system parameters (as discussed above), 208. If no match is found—case "no", the local and global chat content is cleaned up, 222, i.e., assessed to have no long-term relevance, and deleted. Then, the procedure ends, 224, or—if other untreated content elements exist—restarts.

In case of a found match—case "yes"—the topic is extracted, 210, and a reliability validity index is determined, 212. If the reliability index is below or equal to a related threshold value, 214, the local chat history will be cleaned up, 222, as explained above. The reliability index can also be interpreted as the validity index.

In case the reliability index is above the related threshold value, the relevant information is extracted, 216, from the content element, the common chat history is updated, 218, a notification may optionally be sent to the subscribers (notify, 220), and the local chat history may be cleaned up, 222. Then, the procedure ends or restarts, as discussed above.

Figure 3:
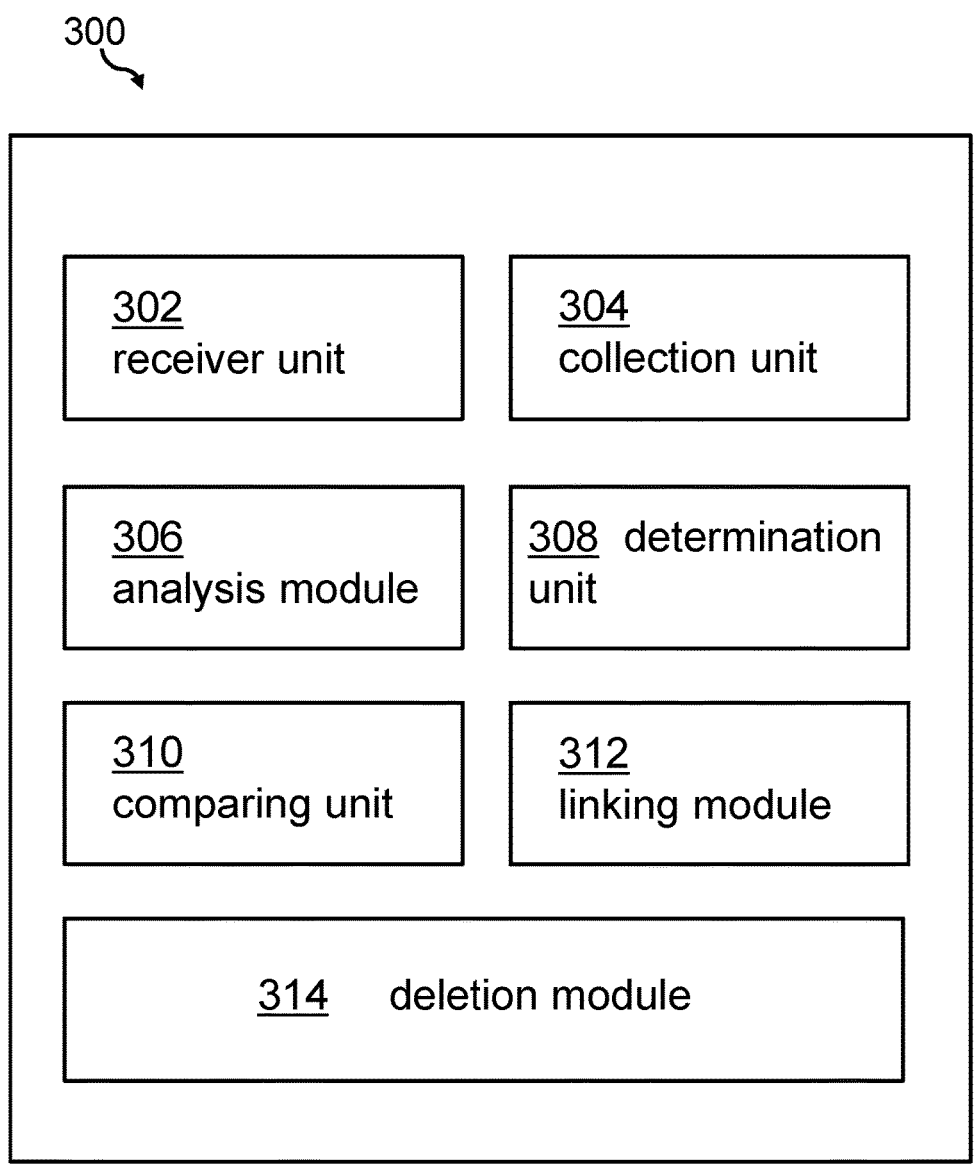
FIG. 3 shows a block diagram of one embodiment of a system for deleting a content element of a chat history, in accordance with one or more aspects of the present invention.

FIG. 3 shows a block diagram of an embodiment of the system 300 for deleting a content element of a chat history of a chat user of a plurality of chat users if the content element does not have a long-term relevance. The system 300 includes a receiver unit 302 adapted for receiving a topic and a user chat specific tag relating to the topic, and a collection unit 304 adapted for receiving content elements of the chat users. The collection unit is also adapted for storing the content elements in a common chat history repository.

The system 300 also includes an analysis module 306 adapted for analyzing the content element by a semantic engine adapted for assigning the content element to the topic, if the semantic engine determines that the content element relates to the tag, and a determination unit 308 adapted for determining a relationship index value for the content element to the topic using a validity value for the content element. The validity value is a function of an access rate to the topic and a credibility index value of an author of the content element.

Additionally, the system 300 includes a comparing unit 310 adapted for comparing the determined relationship index value of the content element to a relationship index threshold value for the topic of a first chat user of the plurality of chat users, wherein the content element has been generated by a second chat user of the plurality of chat users, a linking module 312 adapted for linking the content element of the second chat user to the topic in the chat history of the first chat user, and a deletion module 314 adapted for deleting the content element if it is not linked to any other chat history of another chat user of the plurality of chat users.

Figure 4:
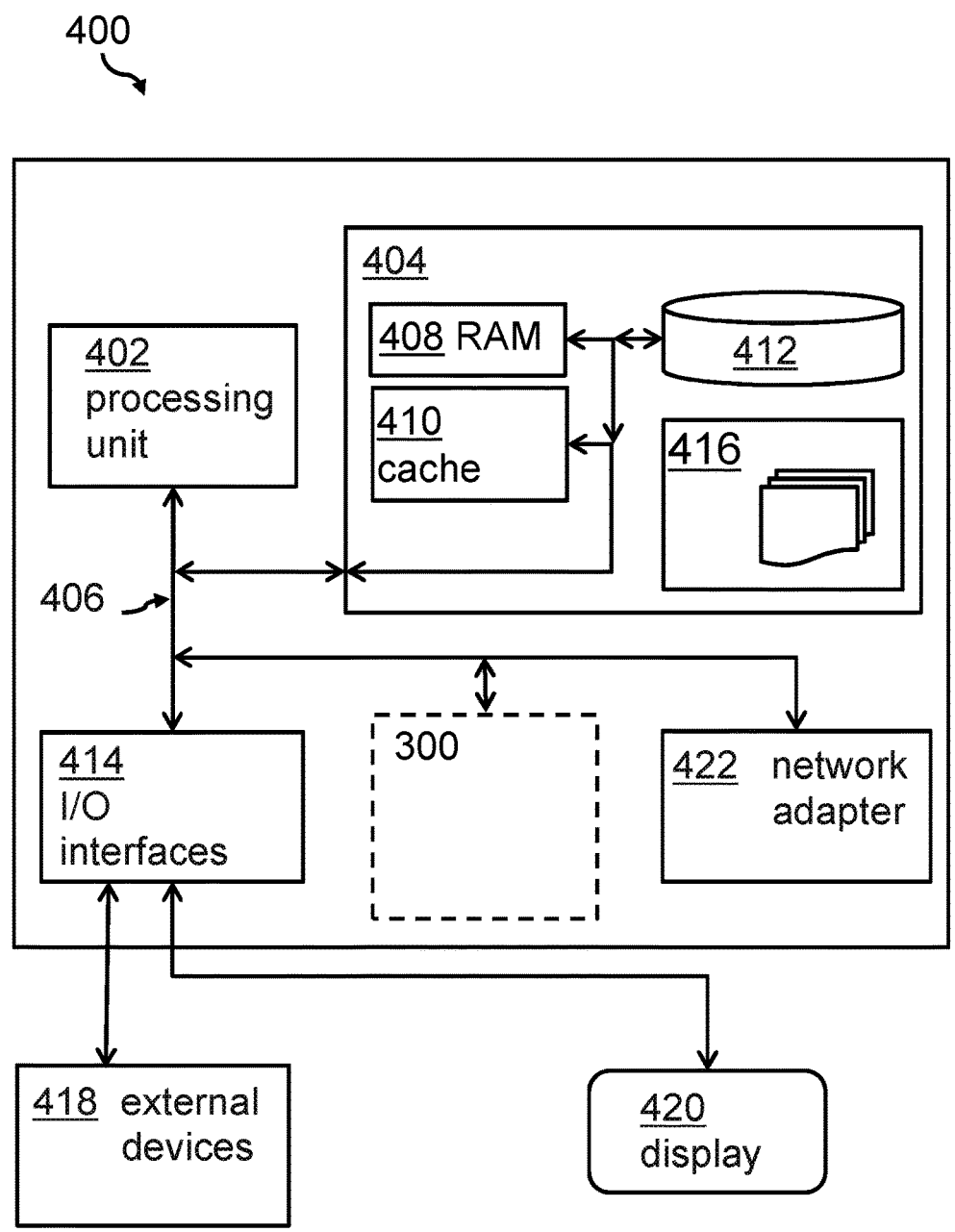
FIG. 4 shows an embodiment of a computing system including a system for deleting a content element of a chat history, in accordance with one or more aspects of the present invention.

Embodiments of the invention may be implemented together with virtually any type of computer, regardless of the platform being suitable for storing and/or executing program code. FIG. 4 shows, as an example, a computing system 400 suitable for executing program code related to the proposed method.

The computing system 400 is only one example of a suitable computer system and is not intended to suggest any limitation as to the scope of use or functionality of embodiments of the invention described herein. Regardless, computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 400 is shown in the form of a general-purpose computing device. The components of computer system/server 400 may include, but are not limited to, one or more processors or processing units 402, a system memory 404, and a bus 406 that couples various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random access memory (RAM) 408 and/or cache memory 410. Computer system/server 400 may further include other removable/non-removable, volatile/non-volatile computer system storage media. By way of example only, storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, memory 404 may include at least one program product having a set (e.g., at least one) of program modules that are configured to carry out the functions of embodiments of the invention.

The program/utility, having a set (at least one) of program modules 416, may be stored in memory 404 by way of example, and not limitation, as well as an operating system, one or more application programs, other program modules, and program data. Each of the operating system, one or more application programs, other program modules, and program data or some combination thereof, may include an implementation of a networking environment. Program modules 416 generally carry out the functions and/or methodologies of embodiments of the invention as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.)

that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that although not shown, other hardware and/or software components could be used in conjunction with computer system/server 400. Examples, include, but are not limited to: microcode, device drivers, redundant processing units, external disk drive arrays, RAID systems, tape drives, and data archival storage systems, etc.

Additionally, system 300 for deleting a content element of a chat history may be attached to the bus system 406.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method of facilitating processing within an online chat system by saving long-term storage space of a common chat history repository of the online chat system, said computer-implemented method comprising:

ascertaining, by the online chat system, whether a content element of the common chat history repository should be deleted, the common chat history repository comprising a database of online text-based communications, the ascertaining based on said content element lacking a long-term relevance, the ascertaining comprising:

receiving a topic and a user specific tag relating to said topic;

receiving said content element of a chat user of a plurality of chat users and storing the content element in the common chat history repository;

assigning, by a semantic engine, said content element to said topic based on said tag being found in said content element;

determining a relationship index value for said content element to said topic using a validity value for said content element, said validity value being a function of an access rate to said topic and a credibility index value of an author of said content element;

comparing said determined relationship index value of said content element to a relationship index threshold value for said topic of a first chat user of said plurality of chat users, wherein said content element has been generated by a second chat user of said plurality of chat users;

linking said content element of said second chat user to said topic in said chat history of said first chat user; and based on the ascertaining, deleting, by the online chat system, said content element where it is not linked to any other chat history of another chat user of said plurality of chat users, the deleting saving the long-term chat storage space.

2. The computer-implemented method according to claim 1, further comprising:

using said topic as sorting criterion in said common chat history repository; and publishing said content elements sorted by said topic.

3. The computer-implemented method according to claim 1, wherein said assigning, said determining, said comparing, said linking and said deleting are each performed periodically or at a predefined point in time.

4. The computer-implemented method according to claim 1, where said validity value is defined as:

validity index=access rate to said topic*credibility index value, wherein said credibility index of a chat user is a number of positive feedback tags related to content elements of said chat user.

5. The computer-implemented method according to claim 4, wherein said relationship index is defined by:

max[(#tag_user-i)/#tag_current)/validity of content element], for all i users, wherein:

tag_user-i is a number of tags defined for a topic of user-i subscribed to a specific topic; and tag_current is a number of tags present in said content element.

6. The computer-implemented method according to claim 1, wherein user specific weight values may be assigned to said user specific tags of a topic.

7. The computer-implemented method according to claim 1, further comprising:

receiving an input value for determining to which topic a newly received content element is to be assigned based on a determined number of tags in said content element not indicating a unique relationship to exactly one topic.

8. The computer-implemented method according to claim 1, wherein said assigning, by said semantic engine, said content element to said topic also takes into account at least one of earlier or later content elements in a same chat thread.

9. A system for facilitating processing within an online chat system by saving long-term storage space of a common chat history repository of the online chat system, said computer system comprising:
   a memory; and
   a processor in communications with the memory, wherein the system performs a method comprising:
      ascertaining, by the online chat system, whether a content element of the common chat history repository should be deleted, the common chat history repository comprising a database of online text-based communications, the ascertaining based on said content element lacking a long-term relevance, the ascertaining comprising:
         receiving a topic and a user specific tag relating to said topic;
         receiving said content element of a chat user of a plurality of chat users and storing the content element in the common chat history repository;
         assigning, by a semantic engine, said content element to said topic based on said tag being found in said content element;
         determining a relationship index value for said content element to said topic using a validity value for said content element, said validity value being a function of an access rate to said topic and a credibility index value of an author of said content element;
         comparing said determined relationship index value of said content element to a relationship index threshold value for said topic of a first chat user of said plurality of chat users, wherein said content element has been generated by a second chat user of said plurality of chat users;
         linking said content element of said second chat user to said topic in said chat history of said first chat user; and
      based on the ascertaining, deleting, by the online chat system, said content element where it is not linked to any other chat history of another chat user of said plurality of chat users, the deleting saving the long-term chat storage space.

10. The system according to claim 9, further comprising:
   using said topic as sorting criterion in said common chat history; and
   publishing said content elements sorted by said topic.

11. The system according to claim 9, wherein said assigning, said determining, said comparing, said linking and said deleting are each performed periodically or at a predefined point in time.

12. The system according to claim 9, wherein said validity value is defined as:

validity index=access rate to said topic credibility index value, where said credibility index of a chat user is a number of positive feedback tags related to content elements of said chat user.

13. The system according to claim 12, wherein said relationship index is defined by:

max[(#tag_user-i)/(#tag_current)/validity index] for all i users subscribed to a specific topic, and wherein:

tag_user-i is a number of tags defined for said topic by user-i; and
   #tag_current is a number of tags present in said content element.

14. The system according to claim 9, wherein user specific weight values may be assigned to said user specific tags of a topic.

15. The system according to claim 9, further comprising:
   receiving input by a chat user for determining to which topic a newly received content element is to be assigned based on a determined number of tags in said content element not indicating a unique relationship to exactly one topic.

16. The system according to claim 9, wherein said assigning, by said semantic engine, said content element to said topic also takes into account at least one of earlier or later content elements in a same chat thread.

17. A computer program product for facilitating processing within an online chat system by saving long-term storage space of a common chat history repository of the online chat system, said computer program product comprising:
   a non-transitory computer readable storage medium having program instructions embodied therewith, said program instructions being executable by one or more computing systems to cause said one or more computing systems to perform a method comprising:
      ascertaining, by the online chat system, whether a content element of the common chat history repository should be deleted, the common chat history repository comprising a database of online text-based communications, the ascertaining based on said content element lacking a long-term relevance, the ascertaining comprising:
         receiving a topic and a user specific tag relating to said topic;
         receiving said content element of a chat user of a plurality of chat users and store the content element in the common chat history repository;
         assigning, by a semantic engine, said content element to said topic based on said tag being found in said content element;
         determining a relationship index value for said content element to said topic using a validity value for said content element, said validity value being a function of an access rate to said topic and a credibility index value of an author of said content element;
         comparing said determined relationship index value of said content element to a relationship index threshold value for said topic of a first chat user of said plurality of chat users, wherein said content element has been generated by a second chat user of said plurality of chat users;
         linking said content element of said second chat user to said topic in said chat history of said first chat user; and
      based on the ascertaining, deleting, by the online chat system, said content element where it is not linked to any other chat history of another chat user of said plurality of chat users, the deleting saving the long-term chat storage space.

18. The computer program product of claim 17, wherein the program instructions are executable by the one or more computing systems to cause the one or more computing systems to:

use said topic as sorting criterion in said common chat history repository; and publish said content elements sorted by said topic.

19. The computer program product of claim 17, wherein said assigning, said determining, said comparing, said linking and said deleting are each performed periodically or at a predefined point in time.

20. The computer program product of claim 17, where said validity value is defined as:

$$validity\ index = access\ rate\ to\ said\ topic * credibility\ index\ value,$$

wherein said credibility index of a chat user is a number of positive feedback tags related to content elements of said chat user.

* * * * *